US006205930B1

United States Patent
Waedekin

(10) Patent No.: US 6,205,930 B1
(45) Date of Patent: Mar. 27, 2001

(54) TROLLEY WHEEL TREAD AND FLANGE

(76) Inventor: Curt J. Waedekin, S103 W20851 Heather La., Muskego, WI (US) 53150

( * ) Notice: Subject to any disclaimer, the term of this patent is extended or adjusted under 35 U.S.C. 154(b) by 0 days.

(21) Appl. No.: 09/265,281

(22) Filed: Mar. 9, 1999

(51) Int. Cl.[7] .................................................. B61B 3/00
(52) U.S. Cl. ............................ 105/154; 295/30; 295/31.1
(58) Field of Search ............................ 105/154; 403/39; 295/31.1, 30, 34; 305/192, 195, 199

(56) References Cited

U.S. PATENT DOCUMENTS

| | | | |
|---|---|---|---|
| 1,218,489 | * 3/1917 | Stuart | 295/30 |
| 1,367,706 | 2/1921 | Loudenslager . | |
| 1,446,463 | * 2/1923 | Hoffman | 295/31.1 |
| 1,811,203 | * 6/1931 | Laughlin | 148/583 |
| 1,869,422 | 8/1932 | Harris . | |
| 2,584,610 | 2/1952 | Pearson | 105/154 |
| 2,861,850 | * 11/1958 | Nyblom | 295/31.1 |
| 2,958,743 | * 11/1960 | Moore | 295/31.1 |
| 2,997,966 | 8/1961 | Chapin et al. | 105/163 |
| 3,107,115 | * 10/1963 | Kastner | 295/31.1 |
| 3,753,789 | * 8/1973 | Kucera et al. | 148/3 |
| 4,230,043 | * 10/1980 | Aldington | 295/31.1 |
| 4,236,456 | 12/1980 | Schreyer et al. | 105/154 |
| 4,480,157 | * 10/1984 | Ishikura et al. | 105/150 |
| 5,138,560 | * 8/1992 | Lanfer et al. | 364/516 |
| 5,662,311 | 9/1997 | Waedekin et al. | 254/273 |
| 5,899,516 | * 5/1999 | Fujimura et al. | 295/1 |

\* cited by examiner

*Primary Examiner*—S. Joseph Morano
*Assistant Examiner*—Lars A. Olson

(57) ABSTRACT

A trolley wheel for a load lifting apparatus that is movable along a rail having a horizontal supporting surface. The wheel includes a crowned tread surface for rolling contact with the rail and a flange for stabilizing the tread surface in position on the rail. The flange includes a substantially crowned realigning portion for realignment of the wheels on the rail with minimal contact or binding. The flange also includes an undercut portion for added clearance between the flange and the rail. Preferably, the crowned tread surface and crowned realigning portions are heat treated for improved wear resistance. The undercut may also be heat treated for added toughness.

20 Claims, 1 Drawing Sheet

TROLLEY WHEEL TREAD AND FLANGE

BACKGROUND OF THE INVENTION

The invention relates to trolley wheels, and more particularly to trolley wheels for an overhead load lifting apparatus such as a monorail hoist. Conventional overhead lifting apparatus such as monorail hoists include trolleys supported by trolley wheels that ride on a rail. Typically, the rail is some variation of an I-beam that includes a substantially horizontal supporting surface with a flat tread supporting surface on which a trolley wheel rolls. To keep the wheel in the proper position on the tread supporting surface, the wheel includes a flange. If the wheel deviates too far from the proper rolling position on the rail, the flange contacts the sidewall of the rail and forces the wheel to move back into the proper rolling position.

While the tread surface of a trolley wheel is often flat, it has been known to crown the tread surface to produce better rolling contact with the supporting surface of the rail. It is also common to linearly taper the flange of the trolley wheel such that only the flange portion nearest the tread surface would ever contact the sidewall of the rail. Examples of these types of trolley wheels are disclosed in U.S. Pat. Nos. 4,236,456 issued to Schreyer et al., 2,997,996 issued to Chapin et al., 2,584,610 issued to Pearson, and 1,367,706 issued to Loudenslager.

It has also been known to use a gradual non-linear tapering on the flange of the trolley wheel. An example of this type of trolley wheel is disclosed in U.S. Pat. No. 1,869,422 issued to Harris.

SUMMARY OF THE INVENTION

Improper and premature trolley wheel wear is a common problem in many monorail hoist systems. Systems that utIlize a wheel with a flat tread surface rolling on a flat supporting surface often encounter various problems created by a mismatch at the rolling interface. Small variations in the surfaces themselves often cause the wheel to wear unevenly due to mismatched contact between the rail supporting surface and the usually softer wheel tread surface. Interface mismatches are also caused by the forces exerted on the trolley that cantilever the wheel off-center, causing the harder rail to dig into the wheel's tread surface.

This common problem can be alleviated by crowning the wheel's tread surface. Mismatches at the rolling interface are significantly or totally eliminated since the crown reduces the surface areas actually in contact. Variations in the surfaces and cantilevering actions of the wheel do not cause uneven or premature wearing. Crowning the wheel's tread surface will allow the wheel to track and fit itself to the rail as it is being used.

A second common problem associated with the trolley wheels of monorail hoists occurs when the sidewall of the rail comes into excessive contact with the flange. Whether the wheel's tread surface is flat or crowned, forces on the trolley cantilever the wheel such that the sidewall of the rail, and especially the corner where the flat supporting surface meets the sidewall, rubs against or digs into the flange. Ideally, a flange should quickly realign the wheel and stabilize it back into the proper position on the rail. Unfortunately, common tapered flanges achieve this objective only after the rail digs into the flange, or the taper causes the wheel to first "ride-up" on the rail. This excessive contact, often known as "scrubbing," usually occurs at the point on the flange nearest to the wheel's tread surface.

To alleviate these problems, the present invention provides a heat treated trolley wheel having both a crowned tread surface that prevents uneven and premature wear, and a non-tapered flange that prohibits the rail from digging into the flange and also prohibits the wheel from riding-up on the rail. The flange design incorporates an undercut directly adjacent the wheel's tread surface that prevents the corner of the rail from contacting the flange. The flange design also incorporates a "kick-back" feature; a substantially crowned realigning portion that prevents the wheel from riding-up on the rail. This flange design is extremely effective in realigning the trolley wheel on the rail with minimal scrubbing.

Specifically, the invention provides a trolley wheel for a load lifting apparatus movable along a rail having a horizontal supporting surface. The wheel includes a tread surface for rolling contact with the rail and a flange for stabilizing the tread surface in position on the rail. The flange includes either a substantially crowned realigning portion for realigning the wheel to its proper rolling position with minimal contact, or an undercut adjacent the tread surface for minimizing contact between the rail and flange, or both.

Preferably, the tread surface of the wheel is crowned, and the radius of curvature of the crowned realigning portion is less than the radius of curvature of the crowned tread surface. Furthermore, the crowned tread surface, crowned realigning portion, and undercut may all be heat treated, preferably to 450 BHN, for improved toughness and wear resistance.

Other features and advantages of the invention will become apparent to those skilled in the art upon review of the following detailed description, claims, and drawings.

Figure 1:
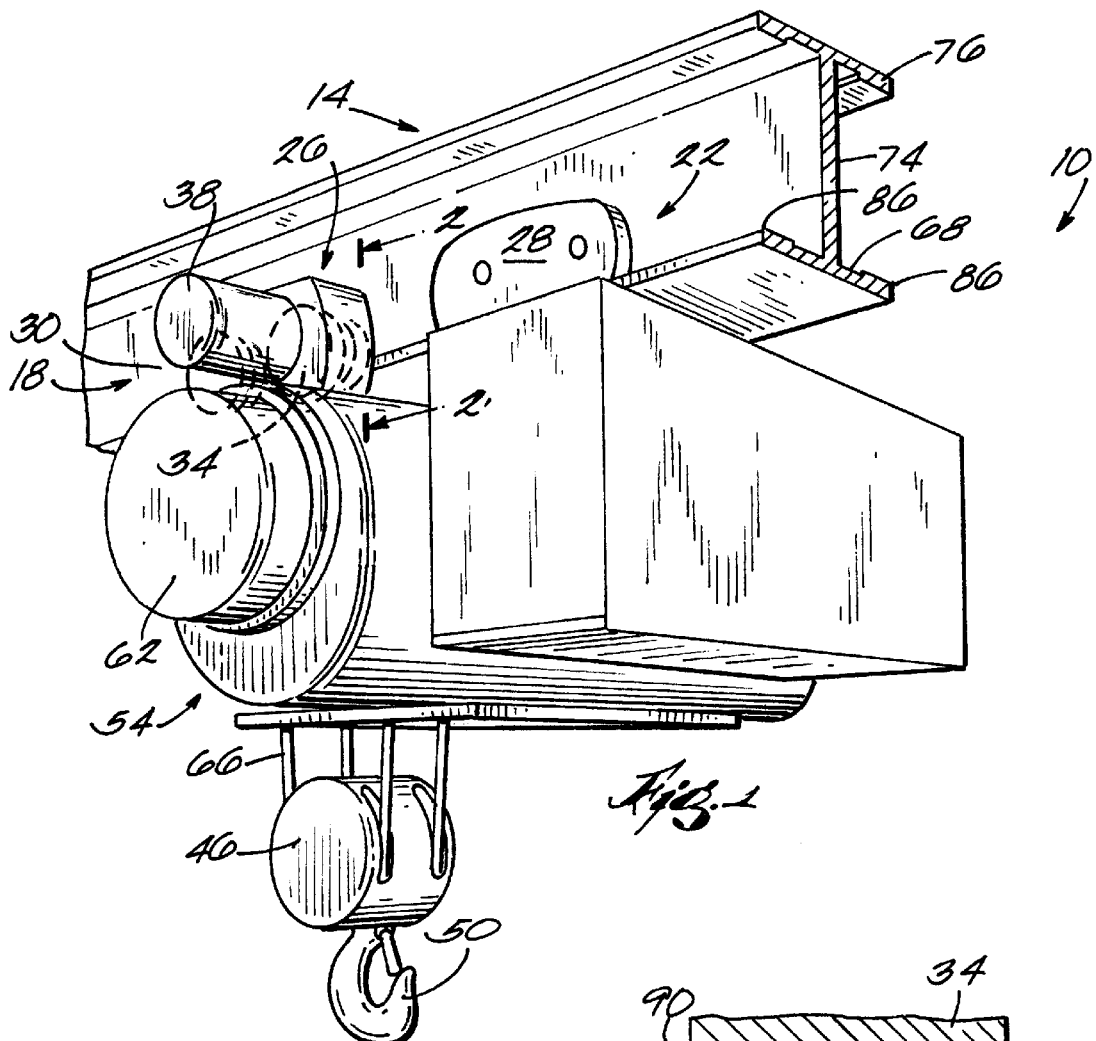
FIG. 1 is a perspective view of a monorail hoist embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DESCRIPTION OF THE PREFERRED EMBODIMENT

Illustrated in the drawings is a load lifting apparatus 10 embodying the invention. The invention can be embodied in various lifting apparatus, such as cranes, weighing systems, and hoists. The illustrated embodiment is a monorail hoist.

As best shown in FIG. 1, the lifting apparatus or hoist 10 generally comprises a horizontally extending overhead rail 14. A trolley 18 is supported on the rail 14. The trolley 18 includes spaced wheel assemblies 22 and 26. The wheel assembly 22 includes a wheel bracket 28 having a pair of opposed wheels (not shown) that are mounted therein for rotation about a horizontal axis and that roll along the rail 14 and support the wheel bracket 28. The wheel assembly 26 includes a wheel bracket 30 having two spaced pairs of opposed drive wheels 34 mounted therein for rotation about respective horizontal axes. The drive wheels 34 roll along the rail 14 and support the wheel bracket 30. A drive motor 38 is operably connected to the wheels 34 for moving the trolley 18 in opposite directions along the rail 14.

The hoist 10 also comprises a load engaging mechanism supported by the wheel assemblies 22 and 26 for engaging a load. In the illustrated embodiment, the load engaging mechanism is a bottom block 46 including a hook 50. In other embodiments the load engaging mechanism can include a grapple, magnet, bucket or scoop suitably adapted for engaging a load.

The hoist 10 also comprises a mechanism for raising and lowering the bottom block 46. Such mechanism preferably includes a hoist mechanism 54. The hoist mechanism 54 includes a hoist drum (not shown) rotatable about a horizontal axis. A conventional hoist motor 62 is operably connected to the hoist drum for rotating the hoist drum in opposite directions to raise and lower the bottom block 46. A cable or lifting rope 66 supports the bottom block 46. In the illustrated embodiment, the lifting rope 66 includes opposite end portions received around the hoist drum and bottom block 46 as is known in the art.

Figure 2:
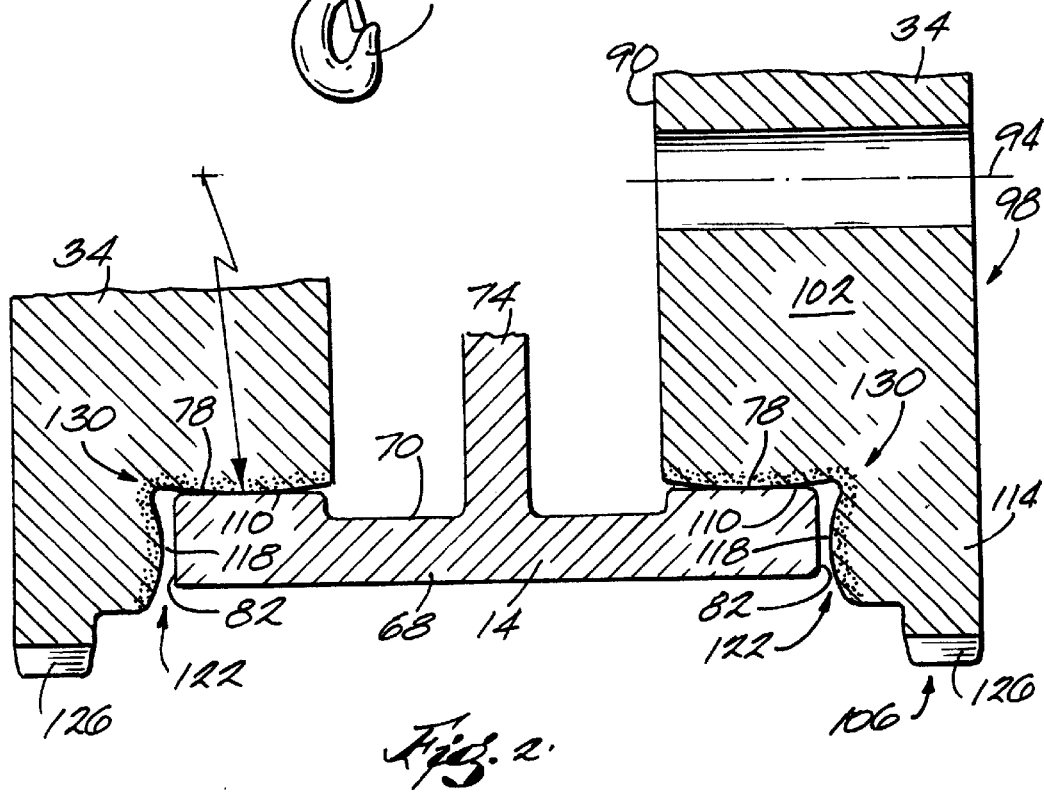
FIG. 2 is an enlarged cross-sectional view taken along line 2—2 in FIG. 1.

As shown in more detail in FIG. 2, the rail 14 includes a lower horizontal portion 68 including a horizontal supporting surface 70. The lower horizontal portion 68 is supported by a vertical web 74, which is in turn supported by an upper horizontal mounting portion 76 (FIG. 1). The rail 14 is a variation of a standard carbon-steel I-beam known in the art and typically has a hardness of 375–425 BHN. Preferably the horizontal supporting surface 70 is symmetrical about the vertical web 74, but this need not be the case.

In the illustrated embodiment, the horizontal supporting surface 70 includes tread supporting surfaces 78 that extend horizontally over the length of the rail 14 for rolling contact with the trolley wheels 34. The outer edges of the horizontal supporting surface 70 and tread supporting surfaces 78 are defined by vertical sidewalls 82. Squared corners 86 (FIG. 1) are defined by the intersection of the tread supporting surfaces 78 and the sidewalls 82.

Each trolley wheel 34 is preferably made of carbon-steel and includes a hub 90 which surrounds an axis of rotation 94 of the wheel 34. The hub 90 is part of a radially inner portion 98 which consists of a body or core material 102 of the wheel 34. The wheel 34 further includes a radially outer portion 106 which includes a tread surface 110 and a flange 114 with an inner surface 118 adjacent and substantially perpendicular to the tread surface 110 for stabilizing the tread surface 110 in position on the rail 14. The tread surface 110 and the flange inner surface 118 make up a wear area 122 of the trolley wheel 34. The radially outer portion 106 also includes a toothed surface 126 for driving engagement with a drive gear (not shown) operably connected to the drive motor 38.

The tread surface 110 extends circumferentially around the radially outer portion 106 for rolling contact with the tread supporting surface 78. The tread surface 110 is slightly crowned for improved wear resistance. In one embodiment, a tread surface 110 having a diameter of 117 millimeters has a radius of curvature of approximately 305 millimeters. Furthermore, the tread surface 110 is preferably heat treated to approximately 450 BHN for additional wear resistance.

The inner surface 118 includes an undercut 130 that provides added clearance between the inner surface 118 and the squared corner 86. The undercut 130 may also be heat treated to approximately 450 BHN for improved toughness, but this need not be the case. The inner surface 118 is crowned to form a realigning portion (also referred to by reference numeral 118) adjacent the undercut 130. In the embodiment described above, the realigning portion 118 has a radius of curvature of approximately 6 millimeters; notably smaller than the 305 millimeter radius of curvature of the tread surface 110. The realigning portion 118 is also heat treated to approximately 450 BHN for superior toughness and wear resistance.

In normal operation, the tread surfaces 110 of opposing wheels 34 roll smoothly in the respective normal tracks on the tread supporting surfaces 78. The respective realigning portions 118 and sidewalls 82 are separated by a clearance ranging from approximately 1/16 to 3/32 of an inch. This clearance is sufficient to prevent "scrubbing" or more severe binding between the inner surfaces 118 and the sidewalls 82. The crowning and heat treating of the tread surfaces 110 minimize wear on the tread surfaces 110.

Should the opposing wheels 34 cantilever due to a bending moment caused by an uneven load on the trolley 18, the tread surfaces 110 may deviate from the normal tracks on the tread supporting surfaces 78. When this occurs, one of the opposing trolley wheels 34 will move laterally inward toward the vertical web 74 until a point on the crown of the realigning portion 118 contacts the associated sidewall 82 and "kicks" both of the tread surfaces 110 back into the normal tracks on the tread supporting surfaces 78. This "kick-back" will occur with minimal contact and without the wheel 34 riding-up on the rail 14. Furthermore, the squared corners 86 will not contact the inner surfaces 118 due to the clearance created by the undercuts 130. Likewise, the squared corners 86 will not dig into the crowned tread surfaces 110.

When the above-described deviation occurs, uneven or excessive wear on the tread surfaces 110 is minimized due to the crowning and heat treating of the tread surfaces 110. The heat treating also improves the impact toughness of the crowned realigning portion 118, thereby reducing the wear and maintaining the effectiveness of the realigning portion 118.

It is important to note that the trolley wheels 34 embodying the present invention need not include both the undercut 130 and the crowned realigning portion 118, but could rather incorporate one or the other as needed for the particular application. Furthermore, it is not a necessity of the present invention that the heat treating occur, or that the preferred hardness values be achieved. Alternatively, other methods of hardening and other hardness values could be substituted.

Various features of the invention are set forth in the following claims.

What is claimed is:

1. A trolley wheel for a load lifting apparatus movable along a rail having a generally horizontal supporting surface and a generally vertical sidewall having an uppermost part, the wheel comprising:

a radially inner portion including an axis of rotation; and a radially outer portion including a tread surface for rolling contact with the horizontal supporting surface of the rail, and a flange for stabilizing said tread surface in position on the rail, said flange including a crowned realigning portion which faces the sidewall when the wheel is on the rail and which is engageable with the sidewalk, said crowned realigning portion being spaced from the uppermost part of the sidewall when said tread surface engages the horizontal supporting surface and said crowned realigning portion engages the sidewall.

2. The trolley wheel as claimed in claim 1, wherein said tread surface is crowned.

3. The trolley wheel as claimed in claim 2, wherein the radius of curvature of said crowned realigning portion is less than the radius of curvature of said crowned tread surface.

4. The trolley wheel as claimed in claim 2, wherein said crowned tread surface is heat treated to approximately 450 BHN.

5. The trolley wheel as claimed in claim 1, wherein said crowned realigning portion is heat treated to approximately 450 BHN.

6. The trolley wheel as claimed in claim 1, wherein said flange further includes an undercut adjacent said tread surface for minimizing contact between said flange and the rail.

7. The trolley wheel as claimed in claim 6, wherein said undercut is heat treated to approximately 450 BHN.

8. A trolley wheel for a load lifting apparatus movable along a rail having a generally horizontal supporting surface and a generally vertical sidewall, the wheel comprising:

a radially inner portion including an axis of rotation; and a radially outer portion including a tread surface for rolling contact with the horizontal supporting surface of the rail, and a flange for stabilizing said tread surface in position on the rail, said flange including a crowned realigning portion which faces the sidewall when the wheel is on the rail and which is engageable with the sidewall, said crowned realigning portion having a surface with an apex that is nearest to the sidewall, said surface being crowned such that said surface curves away from the sidewall on either side of said apex in the radial direction.

9. The trolley wheel as claimed in claim 8, wherein said crowned realigning portion is heat treated to approximately 450 BHN.

10. The trolley wheel as claimed in claim 8, wherein said tread surface is crowned.

11. The trolley wheel as claimed in claim 10, wherein said crowned tread surface is heat treated to approximately 450 BHN.

12. A monorail hoist comprising:

an overhead rail having a generally horizontal supporting surface and a generally vertical sidewall having an uppermost part;

a trolley including at least one trolley wheel, the trolley wheel including a crowned tread surface for rolling contact with the horizontal supporting surface of the rail, and a flange for stabilizing said tread surface in position on the rail, said flange including a crowned realigning portion facing the sidewall of the rail, said crowned realigning portion being spaced from the uppermost part of the sidewall when said tread surface engages the horizontal supporting surface and said crowned realigning portion engages the sidewall, and an undercut between said tread portion and said realigning portion for minimizing contact between said flange and said rail;

a load engaging mechanism for engaging a load; and a hoist mechanism supported by the trolley for raising and lowering said load engaging mechanism.

13. The hoist as claimed in claim 12, wherein the radius of curvature of said crowned realigning portion is less than the radius of curvature of said crowned tread surface.

14. The trolley wheel as claimed in claim 1, wherein said crowned realigning portion has a surface that is spaced a first distance from the sidewall at a radially inner position, that is spaced the first distance from the sidewall at a radially outer position, and that is spaced a second distance from the sidewall at a radial position intermediate said inner and outer positions, said first distance being greater than said second distance.

15. The trolley wheel as claimed in claim 1, wherein said crowned realigning portion has a surface with an apex that is nearest to the sidewall, said surface being crowned such that said surface curves away from the sidewall on either side of said apex in the radial direction.

16. The trolley wheel as claimed in claim 1, wherein said crowned realigning portion has a radially inner end, a radially outer end, and a point that is nearest to the sidewall, said point nearest to the sidewall being between said inner end and said outer end.

17. The trolley wheel as claimed in claim 8, wherein said flange further includes an undercut adjacent said tread surface for minimizing contact between said flange and the rail.

18. The trolley wheel as claimed in claim 17, wherein said undercut is heat treated to approximately 450 BHN.

19. The trolley wheel as claimed in claim 8, wherein said crowned realigning portion has a surface that is spaced a first distance from the sidewall at a radially inner position, that is spaced the first distance from the sidewall at a radially outer position, and that is spaced a second distance from the sidewall at a radial position intermediate said inner and outer positions, said first distance being greater than said second distance.

20. The trolley wheel as claimed in claim 8, wherein said crowned realigning portion has a radially inner end, a radially outer end, and a point that is nearest to the sidewall, said point nearest to the sidewall being between said inner end and said outer end.

* * * * *